No. 751,923. PATENTED FEB. 9, 1904.
J. J. KELLY.
TOBACCO PIPE AND CIGAR OR CIGARETTE HOLDER.
APPLICATION FILED MAR. 10, 1903.
NO MODEL.
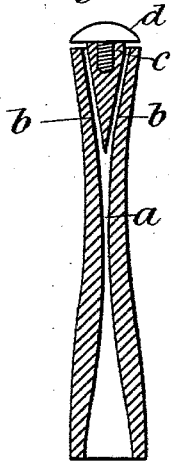
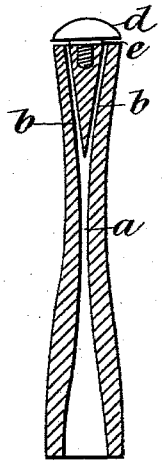
Witnesses.
A. M. Parkins.
J. A. Macdonald.
Inventor.
James Joseph Kelly,
By his Attorneys,
Baldwin, Davidson & Wight.

No. 751,923.                                                        Patented February 9, 1904.

UNITED STATES PATENT OFFICE.

JAMES JOSEPH KELLY, OF DUBLIN, IRELAND.

TOBACCO-PIPE AND CIGAR OR CIGARETTE HOLDER.

SPECIFICATION forming part of Letters Patent No. 751,923, dated February 9, 1904.

Application filed March 10, 1903. Serial No. 147,139. (No model.)

*To all whom it may concern:*

Be it known that I, JAMES JOSEPH KELLY, tobacconist, a subject of the King of Great Britain, residing at 35 Upper Camden street, Dublin, Ireland, have invented certain new and useful Improvements in Tobacco-Pipes and Cigar or Cigarette Holders, of which the following is a specification.

This invention relates to pipes and holders in which the smoke coming out of the bore is diverted or spread laterally by a stud fixed at the end of the stem, thereby preventing any blistering of the tongue and palate, cooling the smoke, and impeding the entrance of saliva into the bore.

Such devices as heretofore proposed have been faulty in design and construction, some failing to attain the objects in view and others being expensive to make and difficult to keep clean.

According to this invention the bore of the pipe is Y-shaped, and thus a wedge-shaped piece is left at the end of the stem, and a stud screws into a hole in the wedge. The wedge either projects beyond the end of the stud or the stud has a collar on its under side. The stud screws down onto and covers the wedge, and its ends project in front of the mouths of the smoke-passages, leaving a passage for the smoke to issue between the end of the stem and the stud.

The pipe-stem or cigar or cigarette holder may be made of any suitable material. The stud also may be made of many materials—
such as bone, ivory, vulcanite, or of gold with a precious stone set in it. A cigar-holder of amber with a jeweled gold stud has a fine effect.

The drawings illustrate stems made in accordance with this invention.

Figure 1 is a longitudinal section of the stem. Fig. 2 is a section of another form.

The bore $a$ divides into two branches $b\ b$ each side of the wedge $c$, whose end projects beyond the end of the stem. $d$ is the stud screwing into the wedge $c$.

In Fig. 2 the stud $d$ is provided with a collar $e$ on its under side.

What I claim is—

1. The combination of a stem having a bore and formed integrally with a wedge dividing the bore into branches, and a stud secured to the base of the wedge between the outer ends of the branches and arranged to divert laterally the course of the smoke issuing from said branches.

2. The combination of a stem having a bore and formed integrally with a wedge dividing the bore of the stem into branches, and a stud secured to the base of the wedge between the outer ends of the branches held away from the outer ends of the branch passages and forming with the end of the stem lateral passages for the smoke.

3. The combination of a stem formed with a Y-shaped bore, and an integral wedge-shaped piece between the branches of the bore at the end of the stem; and a stud consisting of a head, having a flat inner face resting against the outer end of the wedge, and having a screw-shank attached to the wedge, said stud being held away from the outer ends of the branches of the bore and from the end of the stem surrounding the wedge whereby lateral passages are provided for the smoke.

JAMES JOSEPH KELLY.

Witnesses:
 CHARLES DALY,
 H. WAMPTON MOONEY.